United States Patent
Jeffrey (10) Patent No.: US 8,073,291 B2
(45) Date of Patent: Dec. 6, 2011

(54) CENTER BASED IMAGE RESIZER

(75) Inventor: Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 1084 days.

(21) Appl. No.: 11/873,503

(22) Filed: Oct. 17, 2007

(65) Prior Publication Data

US 2009/0103834 A1 Apr. 23, 2009

(51) Int. Cl.
*G06K 9/32* (2006.01)

(52) U.S. Cl. ........ 382/298; 382/293; 382/276; 382/299; 345/660; 345/667; 345/668; 345/671; 345/698; 358/1.2; 358/451

(58) Field of Classification Search .................. None
See application file for complete search history.

(56) References Cited

U.S. PATENT DOCUMENTS

| | | | |
|---|---|---|---|
| 4,991,022 A | 2/1991 | Canfield et al. | |
| 5,097,518 A * | 3/1992 | Scott et al. | 382/298 |
| 5,293,474 A * | 3/1994 | Patil et al. | 715/206 |
| 5,294,998 A * | 3/1994 | Piovoso et al. | 382/261 |
| 5,384,904 A * | 1/1995 | Sprague et al. | 345/668 |
| 5,422,996 A * | 6/1995 | Patil et al. | 345/501 |
| 5,539,534 A * | 7/1996 | Hino et al. | 358/452 |
| 5,594,676 A * | 1/1997 | Greggain et al. | 708/300 |
| 5,751,283 A | 5/1998 | Smith | |
| 5,815,143 A | 9/1998 | Jenney et al. | |
| 5,956,087 A | 9/1999 | Takayama et al. | |
| 5,960,126 A | 9/1999 | Nielsen et al. | |
| 6,005,988 A | 12/1999 | Schroeder | |
| 6,016,152 A | 1/2000 | Dickie | |
| 6,366,292 B1 * | 4/2002 | Allen | 345/611 |
| 6,697,539 B1 * | 2/2004 | Dolan | 382/298 |
| 6,792,149 B1 | 9/2004 | Florencio | |
| 6,943,783 B1 | 9/2005 | Ting et al. | |
| 6,999,107 B2 * | 2/2006 | Matoba et al. | 345/698 |
| 7,456,995 B2 * | 11/2008 | Stephens | 358/1.2 |
| 7,548,233 B1 * | 6/2009 | Lee et al. | 345/204 |

FOREIGN PATENT DOCUMENTS

| | | |
|---|---|---|
| DE | 3938168 | 5/1991 |
| WO | 9012367 | 10/1990 |
| WO | 9113410 | 9/1991 |
| WO | 9212495 | 7/1992 |

\* cited by examiner

*Primary Examiner* — Sath V Perungavoor
*Assistant Examiner* — Jason Heidemann
(74) *Attorney, Agent, or Firm* — Mark P. Watson (57) ABSTRACT

A method for resizing image data from a first size image to a second size image is disclosed. In one operation of the method, a scale factor is determined based on a number of gaps between pixels in the first size image and a number of gaps between pixels in the second size image. In another operation, the scale factor is applied to the first size image to generate a representation of the second size image data. In yet another operation a remainder representing an offset from a last pixel of the first size image data and a last pixel from the representation of the second size image data is determined. With the offset determined, another operation offsets each end pixel of a line of the second size image data by a portion of the remainder.

16 Claims, 6 Drawing Sheets

CENTER BASED IMAGE RESIZER

BACKGROUND OF THE INVENTION

With the proliferation of digital camera technology higher resolution digital cameras are finding their way into more and more consumer electronics. Mobile devices such as cellular or mobile telephones and other portable wireless devices, have benefited from the improved compactness and increased resolution of small digital cameras. This is evident from the increased number of mobile devices that incorporate a digital camera.

However, ergonomics, portability and power consumption can constrain the size of a display incorporated in a mobile device. Even with increased resolution of portable displays, high-resolution digital cameras can necessitate resizing an image on a mobile device in order to fit the entire image on the display. Similarly, in order to display details that can be captured by high-resolution digital camera devices, it may be necessary to resize a portion of the image on a portable electronic device's display. Constrained with often-limited processing capacity of mobile devices, many image resizing processes scale an image from the upper left corner of the image. Unfortunately, scaling from the upper left corner can result in the bottom and right edge of the image not being visible on the display.

In view of the forgoing, there is a need for a center based image resizer.

SUMMARY

In one embodiment, a method for resizing image data from a first size image to a second size image is disclosed. In one operation of the method, a scale factor is determined based on a number of gaps between pixels in the first size image and a number of gaps between pixels in the second size image. In another operation, the scale factor is applied to the first size image to generate a representation of the second size image data. In yet another operation a remainder representing an offset from a last pixel of the first size image data and a last pixel from the representation of the second size image data is determined. With the offset determined, another operation offsets each end pixel of a line of the second size image data by a portion of the remainder.

In another embodiment a method for center-based image resizing is disclosed. In one operation a scale factor is determined based on a number of gaps between pixels in the first size image and a number of gaps between pixels in the second size image. In another operation a vertical remainder is determined, the vertical remainder representing a difference between a last pixel position of the first size image and a last pixel position of the second size image. In yet another operation, a vertical offset is determined for the second size image based on a proportion of the remainder. With the vertical offset determined, another operation applies the scale factor and vertical offset to vertical pixels in the first size image. In still another operation, a horizontal remainder is determined, the horizontal remainder representing a difference between a last pixel position of the first size image and a last pixel position of the second size image. Similar to the vertical offset, a horizontal offset can be determined for the second size image based on a proportion of the remainder. In another operation, the scale factor and horizontal offset are applied to horizontal pixels in the first size image.

In yet another embodiment, a resizer for scaling image data is disclosed. The resizer can include a vertical accumulator. The vertical accumulator can be configured to apply a scale factor based on a number of gaps between vertical pixels in the first image size and a number of gaps between vertical pixels in the second image size. The resizer can also include a horizontal accumulator. The horizontal accumulator can be configured to apply the scale factor based on a number of gaps between horizontal pixels in the first image size and a number of gaps between horizontal pixels in the second image size. Wherein a center based scaled image is output from the resizer based on the scale factor.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for a center-based image resizer capable of scaling images from a first size to a second size based on a central point of the first size. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
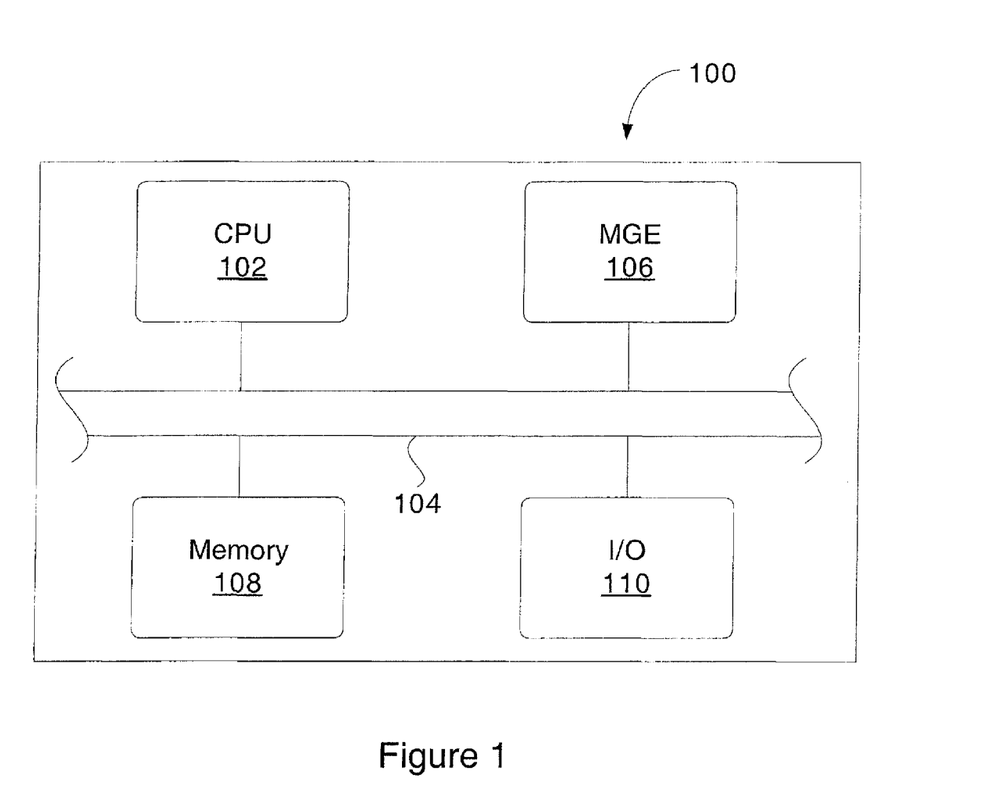
FIG. 1 is a simplified schematic diagram illustrating a high level architecture of a device implementing a center based image resizer in accordance with one embodiment of the present invention.

FIG. 1 is a simplified schematic diagram illustrating a high level architecture of a device 100 implementing a center based image resizer in accordance with one embodiment of the present invention. The device 100 includes a processor 102, a graphics controller or Mobile Graphic Engine (MGE) 106, a memory 108, and an Input/Ouput (I/O) interface 110, all capable of communicating with each other using a bus 104.

Those skilled in the art will recognize that the I/O interface 110 allows the components illustrated in FIG. 1 to communicate with additional components consistent with a particular application. For example, if the device 100 is a portable electronic device such as a cell phone, then a wireless network interface, random access memory (RAM), digital-to-analog and analog-to-digital converters, amplifiers, keypad input, and so forth will be provided. Likewise, if the device 100 is a personal data assistant (PDA), various hardware consistent with a PDA will be included in the device 100.

The processor 102 performs digital processing operations and communicates with the MGE 106. The processor 102 is an integrated circuit capable of executing instructions retrieved from the memory 108. These instructions provide the device 100 with functionality when executed on the processor 102. The processor 102 may also be a digital signal processor (DSP) or other processing device.

The memory 108 may be random-access memory or non-volatile memory. The memory 108 may be non-removable memory such as embedded flash memory or other EEPROM, or magnetic media. Alternatively, the memory 108 may take the form of a removable memory card such as ones widely available and sold under such trade names such as "micro SD", "miniSD", "SD Card", "Compact Flash", and "Memory Stick." The memory 108 may also be any other type of machine-readable removable or non-removable media. Additionally, the memory 108 may be remote from the device 100. For example, the memory 108 may be connected to the device 100 via a communications port (not shown), where a BLUETOOTH® interface or an IEEE 802.11 interface, commonly referred to as "Wi-Fi," is included. Such an interface may connect the device 100 with a host (not shown) for transmitting data to and from the host. If the device 100 is a communications device such as a cell phone, the device 100 may include a wireless communications link to a carrier, which may then store data on machine-readable media as a service to customers, or transmit data to another cell phone or email address. Furthermore, the memory 108 may be a combination of memories. For example, it may include both a removable memory for storing media files such as music, video or image data, and a non-removable memory for storing data such as software executed by the processor 102.

Figure 2:
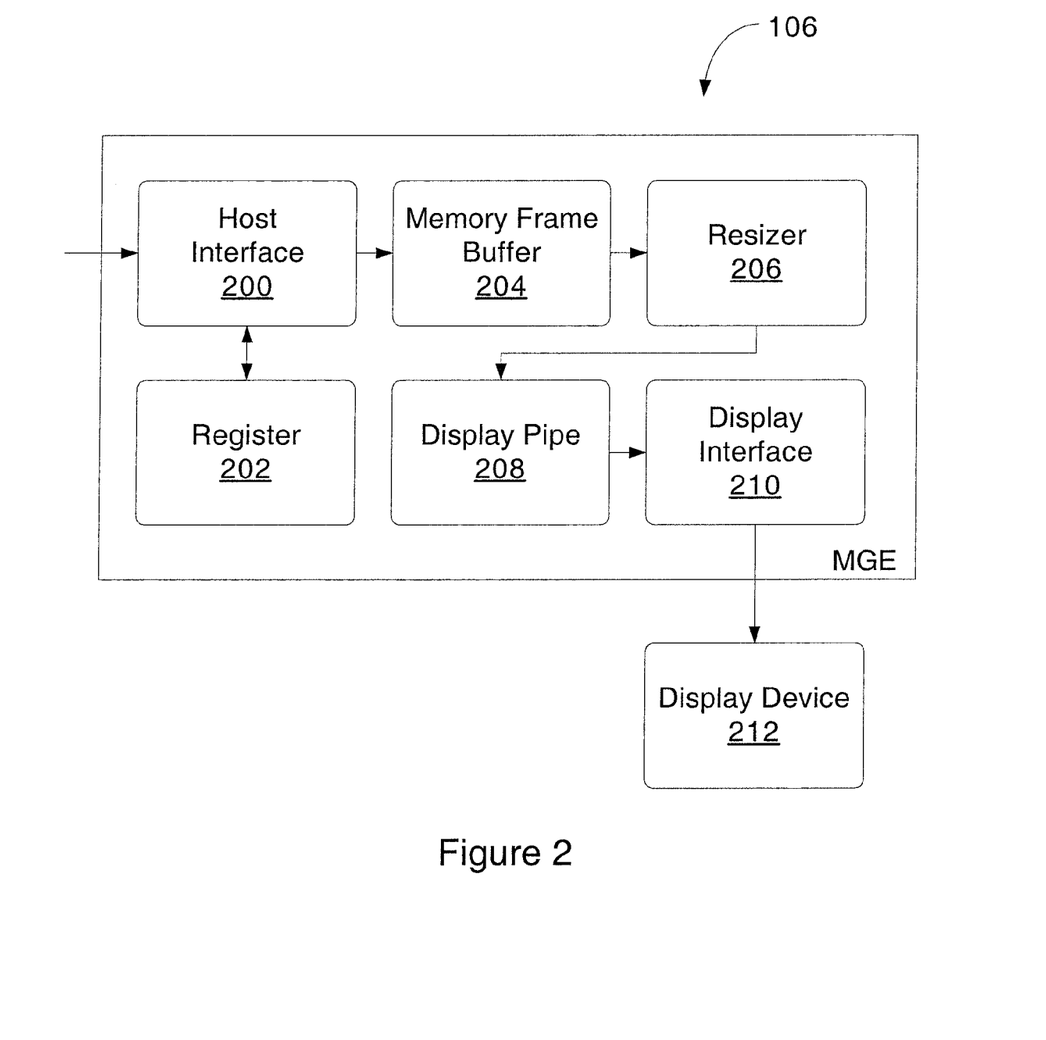
FIG. 2 is a simplified schematic diagram illustrating a high level architecture for the graphics controller 106 in accordance with one embodiment of the present invention.

FIG. 2 is a simplified schematic diagram illustrating a high level architecture for the graphics controller 106 in accordance with one embodiment of the present invention. The graphics controller 106 can accept input to host interface module 200. For example, the host interface module 200 can receive pixel data to be processed by the graphics controller 106. As previously discussed, the graphics controller 106 can also be referred to as an MGE or alternatively, a Liquid Crystal Display Controller (LCDC) or a Graphics Processing Unit (GPU). Additionally, the host interface module 200 can also receive various signals to synchronizing various buses and clocks to ensure proper communications to other components of the device. The host interface 200 can also bi-directionally communicate with a register 202. The register 202 can broadly be defined as a storage area for hardware input/output. Though the register 202 is shown as a single module, in other embodiments registers can be distributed throughout the graphics controller 106. Registers can be associated with components of the graphics controller 106 that are illustrated in FIG. 2 along with additional components that are not illustrated for simplicity. Also connected to the host interface 200 is a memory frame buffer 204. The memory frame buffer 204 can broadly be defined as a storage area for pixel data. In one embodiment, the memory frame buffer 204 can be a first-in-first-out (FIFO) buffer. Other embodiments can use different types or techniques to buffer pixel data. One skilled in the art should recognize that the examples provided are intended to be exemplary and do not limit the scope of this disclosure.

A resizer module 206 can receive pixel data from the memory frame buffer 204 and includes logic capable of calculating and manipulating pixel data to resize an image based on a center of the image. The resizer module 206 can resize an image based on manipulating the distance, or gaps, between adjacent pixels. As will be described in further detail below, decreasing the distance between adjacent pixels, results in zooming in on an image. Conversely, increasing the distance between adjacent pixels results in zooming out of an image. Pixel data for the resized image can then go to a display pipe 208. Broadly defined, the display pipe 208 is a memory capable of storing pixel data for the resized image. In one embodiment, the display pipe 208 can be a FIFO buffer. Connected to the display pipe 208 is a display interface 210. The display interface 210 can be used to manipulate pixel data from the display pipe 208 so it can be properly formatted for a display device 212. In some embodiments, the display device 212 can integrated into the device such as displays for mobile phones, portable video game systems and smartphones. In other embodiments, the display device 212 can be external to the device requiring an external connection such as a discrete computer monitor.

Figure 3:
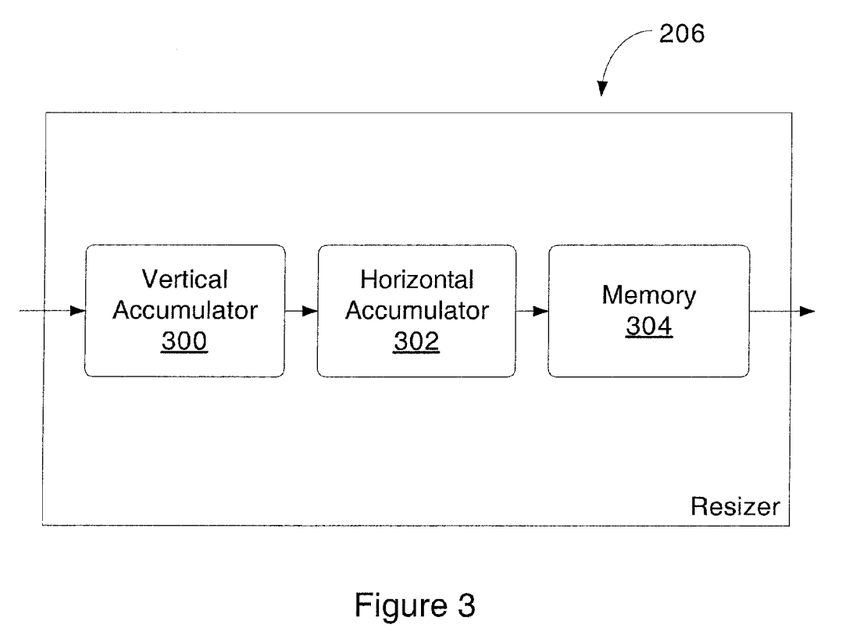
FIG. 3 is a high level schematic illustrating elements within the resizer module 206, in accordance with one embodiment of the present invention.

FIG. 3 is a high level schematic illustrating elements within the resizer module 206, in accordance with one embodiment of the present invention. As shown in FIG. 3, data processed by the resizer 206 first pass through a vertical accumulator 300 and then a horizontal accumulator 302 before being stored in a memory 304. Note that in other embodiments, data can be processed by the horizontal accumulator, passed to the vertical accumulator and then stored in a memory. Alternatively, other permutations are possible where a separate memory is maintained for each accumulator.

FIGS. 4A-4D illustrate changes in horizontal pixel spacing calculated using the horizontal accumulator of the center-based resizer to display new pixels $N_0$-$N_7$ from original pixels $O_0$-$O_4$, in accordance with one embodiment of the present invention. In one embodiment of the center-based resizer calculations for pixel placement of a resized image are based on the number of gaps between pixels of an original image and the number of gapes between pixels in the resized image. For example, if the original image has X pixels in a row or column, then there are X−1 equally spaced gaps between the pixels. Similarly, resizing an image with Y pixels in a row or column means there are Y−1 gaps.

Figure 4A:
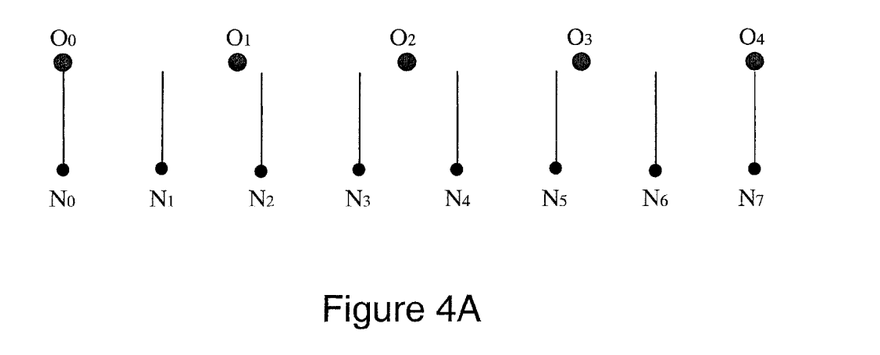
FIG. 4A illustrates an original image having a width of five pixels, represented by original pixels $O_0$-$O_4$ that will be scaled to a resized image having eight pixels $N_0$-$N_7$, in accordance with one embodiment of the present invention.

FIG. 4A illustrates an original image having a width of five pixels, represented by original pixels $O_0$-$O_4$ that will be scaled to a resized image having eight pixels $N_0$-$N_7$, in accordance with one embodiment of the present invention. As this is a center based resizer, all attempts will be made to align the first ($N_0$) and last ($N_7$) new pixels of the resized image with the location of the first ($O_0$) and last ($O_4$) pixels of the original image shown in FIG. 4A. Thus, the original pixels are separated by four equally spaced gaps whereas the resized image will have seven equally spaced gaps.

Figure 4B:
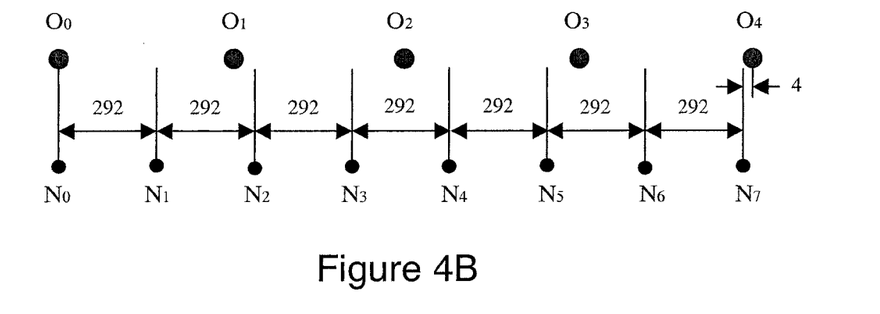
FIG. 4B illustrates pixel spacing between the resized image pixels in accordance with one embodiment of the present invention.

FIG. 4B illustrates pixel spacing between the resized image pixels in accordance with one embodiment of the present invention. To determine the resized pixel spacing, a scale factor for this particular embodiment is calculated using the following formula:

$$\text{scale factor} = (\text{original width}-1)/(\text{resized width}-1)$$

Using fixed point math, with seven bits of integer and nine bits of decimal, the scale factor calculation becomes:

scale factor=$2^9\Delta$(original width−1)/(resized width−1)
=512$\Delta$(4/7)=292remainder4

Where the $2^9$ is used to calculate the nine bits of decimal. Thus, spacing between the resized image pixels $N_0$-$N_7$ is calculated. Note that alternative values of integer and decimal values can be used when calculating the scale factor. One skilled in the art should recognize that the values provided above are intended to be exemplary and should not be construed to limit the claims. Because of the finite precision of the calculation in hardware, some scale factors will not be calculated as integers resulting in a leftover remainder. A scale factor with a remainder means that the last pixel of the resized image will be misaligned with the last pixel of the original image. The amount of misalignment means the resized image will not be perfectly centered because the last pixel of the resized image and the last pixel of the original image is offset by the remainder value.

Figure 4C:
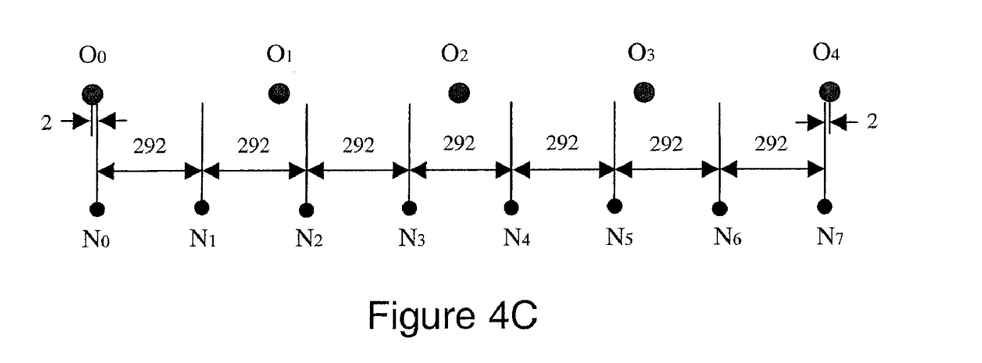
FIG. 4C illustrates correcting the offset caused by the remainder value in accordance with one embodiment of the present invention.

FIG. 4C illustrates correcting the offset caused by the remainder value in accordance with one embodiment of the present invention. To correct for the offset, the position of the first pixel of the resized image can be shifted by a value that is half of the remainder, or:

offset=(remainder)/2

Thus, using the values of the current example results in the first pixel of the resized image being offset by two. Dividing the remainder by two results in the offset centering the resized image. In other embodiments it may be desirable to calculate the offset by dividing the remainder by a value other than two. While this can result in the resized image no longer appearing centered on a display in relation to the original image, the resized image will still be resized proportionally based on the gaps between pixels. In alternative embodiments, the scale factor can be further defined as a vertical scale factor and a horizontal scale factor. In embodiments where the horizontal and vertical scale factors are not identical, it is possible that the resized image will be distorted because of the asymmetric scale factors.

Figure 4D:
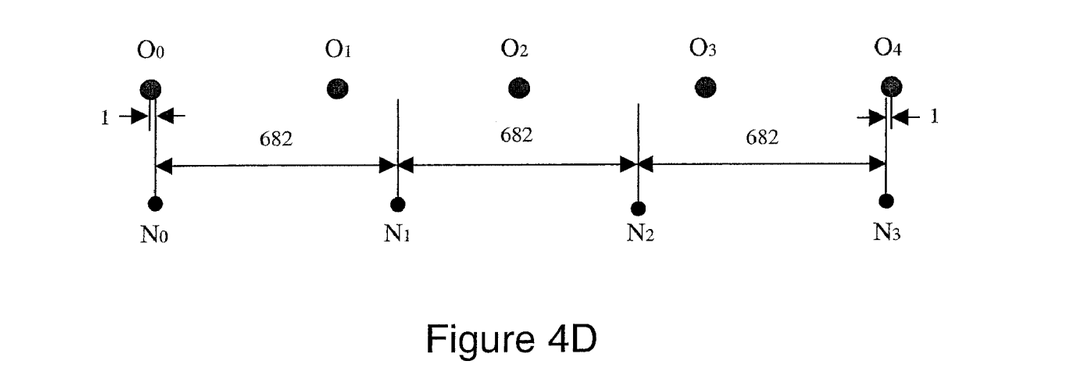
FIG. 4D illustrates the result of center-based image resizing when an original image is resized to a smaller size, in accordance with one embodiment of the present invention.

FIG. 4D illustrates the result of center-based image resizing when an original image is resized to a smaller size, in accordance with one embodiment of the present invention. In this example, the original image has a width of five pixels and the resized image has a width of four pixels. Using the fixed point math formula to determine scale factor results in:

scale factor=$2^9\Delta$(original width−1)/(resized width−1)
=512$\Delta$(4/3)=682remainder2

As there is a remainder, to correct for the misalignment of the last pixel, the first pixel can be offset by half of the remainder, or one.

One skilled in the art should note that the techniques discussed to illustrate calculations of the horizontal accumulator in FIG. 4A-4D can also be applied to the vertical accumulator using columns of pixels separated by a vertical pixel spacing.

Figure 5:
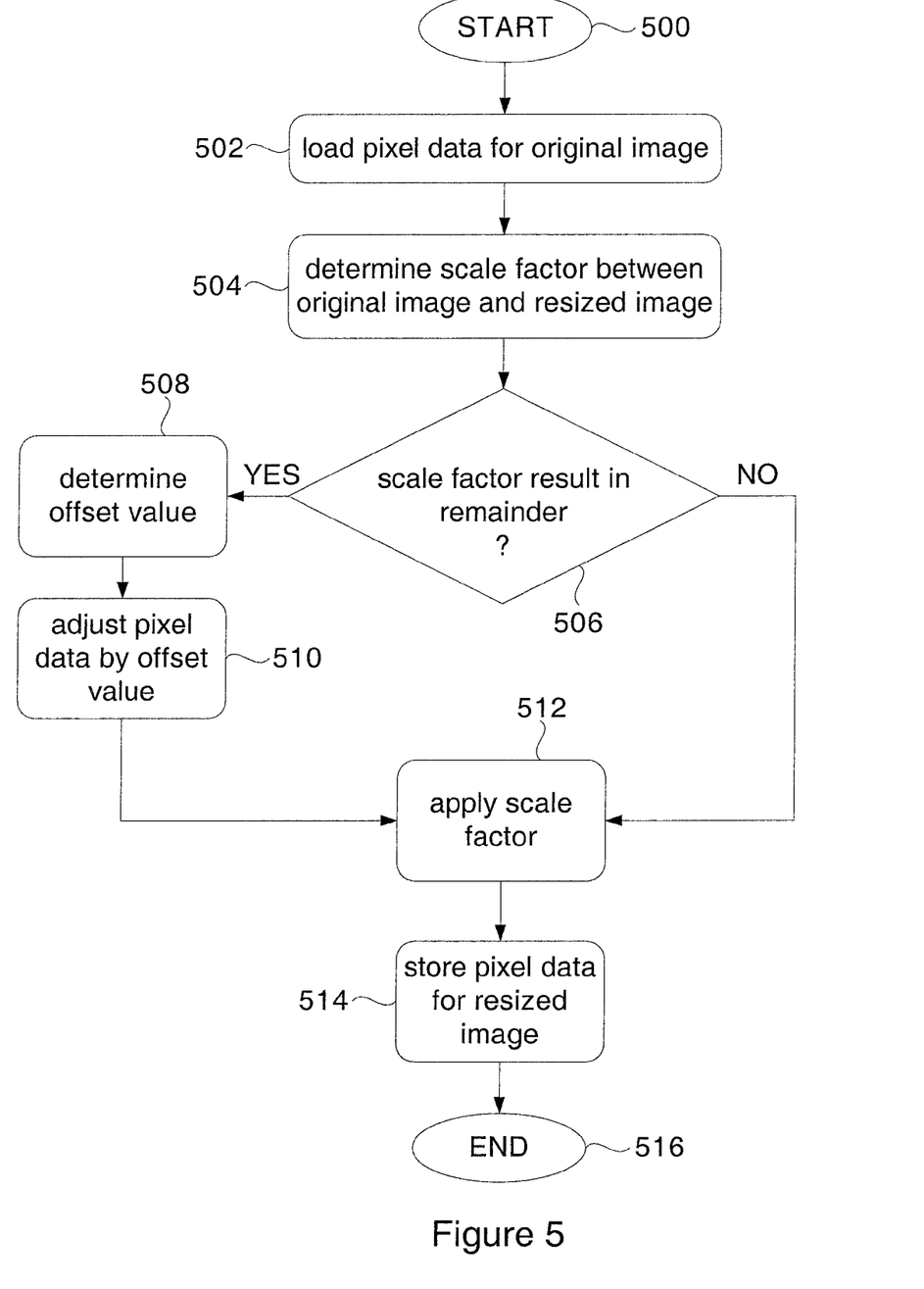
FIG. 5 is a flowchart illustrating the operations that perform center based resizing in accordance with one embodiment of the present invention.

FIG. 5 is a flowchart illustrating the operations that perform center based resizing in accordance with one embodiment of the present invention. Operation 500, START beings in the procedure. Operation 502 loads pixel data for an original image, the pixel data including pixel location data, for the original image. In operation 504, a scale factor is determined based on the desired resized image. In the embodiment illustrated in FIG. 5, the resized image will be positioned to appear centered relative to the original image after being resized. In order to center the resized image relative to the original image, operation 506 determines whether the scale factor calculation results in a remainder.

If the resized image results in a remainder, operation 508 is used to determine an offset value. Operation 510 adjusts the scaled pixel data by the offset value calculated in operation 508 while operation 512 applies the scale factor to the pixel data of the original image. In other operations, operation 514 stores the pixel data for the resized image in a memory location while operation 516 terminates the procedure. Note that in embodiments where the resized image does not need to be centered relative to the original image, operations 508-512 do not need to be performed.

If operation 506 determines that the scale factor will not result in a remainder, operation 512 applies the scale factor to the pixel data for the original image. In other operations, operation 514 stores the pixel data for the resized image in a memory location and operation 516 terminates the procedure.

It will be apparent to one skilled in the art that the functionality described herein may be synthesized into firmware through a suitable hardware description language (HDL). For example, the HDL, e.g., VERILOG, may be employed to synthesize the firmware and the layout of the logic gates for providing the necessary functionality described herein to provide a hardware implementation of the resizing techniques and associated functionalities.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for resizing image data from a first size image to a second size image, comprising:
   determining a scale factor based on a number of gaps between pixels in the first size image and a number of gaps between pixels in the second size image;
   applying the scale factor to the first size image to generate a representation of the second size image data;
   determining a remainder representing an offset from a last pixel of the first size image data and a last pixel from the representation of the second size image data; and
   offsetting each end pixel of a line of the second size image data by a portion of the remainder.

2. The method for resizing image data as in claim 1, wherein the portion of the remainder is one-half, the one-half portion of the remainder centering the second size image data in relation to the first size image data.

3. The method for resizing image data as in claim 1, wherein the scale factor is applied to vertical spacing between pixels in the first image size.

4. The method for resizing image data as in claim 1, wherein the scale factor is applied to horizontal spacing between pixels in the first image size.

5. The method for resizing image data as in claim 1, wherein the scale factor is applied to vertical spacing and horizontal spacing between pixels in the first image size.

6. A method for center-based image resizing, comprising:
   determining a scale factor based on a number of gaps between pixels in the first size image and a number of gaps between pixels in the second size image;
   determining a vertical remainder representing a difference between a last pixel position of the first size image and a last pixel position of the second size image;
   determining a vertical offset for the second size image based on a proportion of the remainder;
   applying the scale factor and vertical offset to vertical pixels in the first size image;

determining a horizontal remainder representing a difference between a last pixel position of the first size image and a last pixel position of the second size image;

determining a horizontal offset for the second size image based on a proportion of the remainder; and applying the scale factor and horizontal offset to horizontal pixels in the first size image.

7. The method for center-based image resizing as in claim 6, wherein the portion of the remainder is one-half, the one-half portion of the remainder centering the second size image data in relation to the first size image data.

8. The method for center-based image resizing as in claim 6, wherein the scale factor includes a vertical scale factor and a horizontal scale factor.

9. A method for center-based image resizing as in claim 8, wherein the vertical scale factor and horizontal scale factor are different.

10. A computer-implemented resizer for scaling image data, comprising:

a horizontal scale factor component configured to include logic to identify a number of gaps between the horizontal pixels within a row, a vertical accumulator, the vertical accumulator configured to apply a scale factor based on a number of gaps between vertical pixels in the first image size and a number of gaps between vertical pixels in the second image size; and a horizontal accumulator, the horizontal accumulator configured to apply the scale factor based on a number of gaps between horizontal pixels in the first image size and a number of gaps between horizontal pixels in the second image size, wherein a center based scaled image is output from the resizer based on the scale factor and the horizontal accumulator includes logic configured to determine a horizontal remainder based on the horizontal scale factor, a portion of the remainder applied to offset each end pixel of a line.

11. The resizer for scaling image data as in claim 10, wherein the portion of the remainder applied to offset each horizontal row of pixels is one-half, the one-half portion horizontally centering the center based scaled image.

12. The resizer for scaling image data as in claim 10, further including:

a vertical scale factor component configured to include logic to identify a number of gaps between the vertical pixels within a column.

13. The resizer for scaling image data as in claim 12, wherein the vertical accumulator includes logic configured to determine a vertical remainder based on the vertical scale factor, a portion of the remainder applied to offset each end pixel of a column.

14. The resizer for scaling image data as in claim 13, wherein the portion of the remainder applied to offset each vertical column of pixels is one-half, the one-half portion vertically centering the center based scaled image.

15. The resizer for scaling image data as in claim 13, wherein the resizer is integrated into a graphics processing unit.

16. The resizer for scaling image data as in claim 15, wherein the graphics processing unit is incorporated into a portable electronic device.

* * * * *